USOO9824343B2

United States Patent
Thompson

(10) Patent No.: US 9,824,343 B2
(45) Date of Patent: Nov. 21, 2017

(54) PLATFORM-AS-A-SERVICE BILLING

(71) Applicant: International Business Machines Corporation, Armonk, NY (US)

(72) Inventor: Timothy J. Thompson, St. Thomas (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 777 days.

(21) Appl. No.: 13/693,985

(22) Filed: Dec. 4, 2012

(65) Prior Publication Data
US 2014/0156477 A1   Jun. 5, 2014

(51) Int. Cl.
G06Q 30/04     (2012.01)
G06Q 20/14     (2012.01)
G06Q 10/10     (2012.01)
G06Q 10/06     (2012.01)

(52) U.S. Cl.
CPC .......... *G06Q 20/145* (2013.01); *G06Q 10/10* (2013.01); *G06Q 30/04* (2013.01)

(58) Field of Classification Search
USPC .......... 709/223; 718/1; 455/17; 705/34, 7.22
See application file for complete search history.

(56) References Cited

U.S. PATENT DOCUMENTS

2008/0319926 A1   12/2008   Alam et al.
2009/0327471 A1*  12/2009   Astete ................ G06F 9/45533
                                                         709/223
2010/0049570 A1   2/2010   Li et al.
2011/0243553 A1   10/2011  Russell
2012/0022910 A1*  1/2012   Chi .................... G06F 9/5072
                                                         705/7.22
2012/0116937 A1   5/2012   Van Biljon et al.
2012/0123886 A1   5/2012   Brown et al.
2013/0130733 A1*  5/2013   Ali-Vehmas .......... H04W 76/02
                                                         455/517

FOREIGN PATENT DOCUMENTS

WO    2012/024955 A1    3/2012

OTHER PUBLICATIONS

U.S. Office Action for U.S. Appl. No. 14/056,065, dated Mar. 12, 2015, pp. 1-15, Alexandria, VA, USA.
U.S. Vacated Office Action for U.S. Appl. No. 14/056,065, dated Oct. 5, 2015, pp. 1-26, Alexandria, VA, USA.

(Continued)

*Primary Examiner* — Scott Zare
*Assistant Examiner* — Reva R Danzig
(74) *Attorney, Agent, or Firm* — Lee Law, PLLC; Christopher B. Lee

(57) ABSTRACT

An illustrative embodiment of a process for reconciling billing measures to cost factors, comprising receiving, by one or more processors, a set of billing measures from one or more applications and a set of cost factors from infrastructure feeds. Analyzing the set of billing measures and cost factors received, using a set of defined relationships to create analyzed information and generates, by the one or more processors, a set of reports using the analyzed information. Responsive to a determination to update the set of definitions, update the sets of definitions using information from the generated reports.

14 Claims, 9 Drawing Sheets

(56) References Cited

OTHER PUBLICATIONS

U.S. Office Action for U.S. Appl. No. 14/056,065, dated Dec. 17, 2015, pp. 1-27, Alexandria, VA, USA.
Georgios Gousios, et al., Aquarium: An Extensible Billing Platform for Cloud Infrastructures, Article, Jan. 8, 2012, pp. 1-5, GBNET, Published online at: https://code.grnet.gr/attachments/download/1149/Aquarium-paper.pdf.
Rene Sotola, Billing in the cloud: The missing link for cloud providers (Abstract only), Journal of Telecommunications Management, Feb. 2011, p. 1, vol. 3, No. 4, Henry Stewart Publications LLP, Published online at: http://henrystewart.metapress.com/app/home/contribution.asp?referrer=parent&backto=searcharticlesresults,2,2;.
Xin Wang, et al., Pricing Network Resources for Adaptive Applications, Article, IEEE/ACM Transactions on Networking, Jun. 2006, pp. 506-519, vol. 14, No. 3, IEEE Xplore, Published online at: http://ieeexplore.ieee.org/xpl/login.jsp?tp=&arnumber=1642731&url=http%3A%2F%2Fieeexplore.ieee.org%2Fxpls%2Fabs_all.jsp%3Farnumber%3D1642731.
U.S. Office Action for U.S. Appl. No. 14/056,065, dated Jul. 15, 2016, pp. 1-36, Alexandria, VA, USA.
U.S. Office Action for U.S. Appl. No. 14/056,065, dated Jan. 18, 2017, pp. 1-19, Alexandria, VA, USA.
Reva R. Danzig, Examiner, United States Patent and Trademark Office, Notice of Allowance for U.S. Appl. No.: 14/056,065, Aug. 10, 2017, pp. 1-17, Alexandria, VA, USA.

\* cited by examiner

Cloud system 100

Structure relationships 600

PLATFORM-AS-A-SERVICE BILLING

BACKGROUND

1. Technical Field

This disclosure relates generally to billing for services in a data processing system and more specifically to platform-as-a-service billing to cost process for a multi-tenant software-as-a-service environment in the data processing system.

2. Description of the Related Art

As software-as-a-service (SaaS) usage expands in the computing industry, the importance of balancing revenue with expense becomes an increasingly difficult challenge. Usage of subscription-based services (pay as you go) typically implies a different model from a traditional software-licensing model. As a service provider incurs infrastructure costs, the service provider must ensure proper fees are in place for cost-recovery plus a profit margin to validate the business of the service provider.

Traditional software and hardware purchases were formerly well-understood and distinguishable as capital expenditures (computer, network, other tangible components) and client application implementation. However evolving cloud infrastructures are typically creating a gap between end-client application understanding with required technical adeptness for the implementation and operation of the infrastructures. Additionally, a cloud paradigm offers economy of scale by introducing multi-tenancy, in which multiple clients utilize the same infrastructure.

An accepted layering of infrastructure in a cloud system, as in layers 1 through 4, viewed from the bottom-up is presented in FIG. 1. Layer 1 comprises component supply 102 containing hardware, and software including host system and networking components. Layer 2 comprises Infrastructure-as-a-Service (IaaS) 104 representing a set of components comprising operating system components, virtualization components and additional components representative of the physical elements of the cloud. Layer 3 comprising Platform-as-a-Service (PaaS) 106 represents a set of components comprising middleware components including database servers, application servers, and application executable code. Layer 4 comprises Software-as-a-Service (SaaS) 108 representing a set of components comprising user applications, which are up and running, ready for use by the users of the respective tenants.

Traditional business accounting practices are typically correlated with layer 1 and layer 2 as capital expenditures, while layer 3 and layer 4 items are typically correlated with software licensing including perhaps additional maintenance components plus staff resources to implement and maintain.

The cloud paradigm mixes the accounting practices across multiple providers while also providing a potential economy of scale across multiple tenants within the same platform and infrastructure using the same components. The challenge, then, is to maintain within a billing model the simplicity of the SaaS product view which isolates end users from investing, installing and maintaining an information technology infrastructure, while also recognizing and reconciling ever increasing complexity, variety and multi-tenancy of the platform, infrastructure and component layers as outlined in cloud system 100 of FIG. 1.

Existing SaaS billing models are typically categorized as detailed usage tracking, pre-determined performance, time-period subscription and a combination of categories detailed usage tracking in which many utility-based approaches track resource consumption including processor (CPU) utilization, recording transaction counts, and disk usage; however, the tracking adds overhead to the provider while also adding complexity and unpredictability to the billing mechanism. Pre-determined performance is a category in which an end-user requests a certain platform performance equivalency, for example, reserving a number of CPUs, or a quantity of disk space, thus identifying a specific resource allocation (and resulting performance). A time-period subscription category defines a basic cost/time approach, which may be applicable to simple SaaS applications, but becomes increasingly difficult to support as an industry grows to include more complex and dynamic service offerings. The time-period subscription model typically results in complex application compartmentalization and billing. A combination of two (or more) categories as previously defined enables various combinations to address billing requirements.

As a result, current billing models may re-introduce information technology complexity of the infrastructure layer back to the client, or by way of over-simplification with service-provider reconciliation risks.

SUMMARY

According to one embodiment, a process for reconciling billing measures to cost factors, comprises receiving, by one or more processors, a set of billing measures from one or more applications and a set of cost factors from infrastructure feeds. Analyzing the set of billing measures and cost factors received, using a set of defined relationships to create analyzed information. The one or more processors generate a set of reports using the analyzed information. Responsive to a determination to update the set of definitions, the one or more processors update the sets of definitions using information from the generated reports.

According to another embodiment, a computer program product for reconciling billing measures to cost factors, comprises one or more computer-readable data storage devices and program instructions stored on at least one of the one or more computer-readable data storage devices. The program instructions comprise computer executable program code for receiving, by one or more processors, a set of billing measures from one or more applications; computer executable program code for receiving, by the one or more processors, a set of cost factors from infrastructure feeds; computer executable program code for analyzing the set of billing measures and cost factors received, by the one or more processors, using a set of defined relationships to create analyzed information; computer executable program code for generating, by the one or more processors, a set of reports using the analyzed information; computer executable program code for determining, by the one or more processors, whether to update the set of definitions and computer executable program code for the one or more processors responsive to a determination to update the set of definitions, updating the sets of definitions using information from the generated reports.

According to another embodiment, an apparatus for reconciling billing measures to cost factors, comprises a communications fabric, one or more computer-readable data storage devices connected to the communications fabric, a memory connected to the communications fabric, wherein the memory contains computer executable program code, a communications unit connected to the communications fabric, an input/output unit connected to the communications fabric and one or more processors connected to the communications fabric. The one or more processors executes the computer executable program code to direct the apparatus to receive, by the one or more processors, a set of billing measures from one or more applications, and receive, by the one or more processors, a set of cost factors from infrastructure feeds. The one or more processors executes the computer executable program code to direct the apparatus to analyze the set of billing measures and cost factors received, by the one or more processors, using a set of defined relationships to create analyzed information and to generate, by the one or more processors, a set of reports using the analyzed information. The one or more processors executes the computer executable program code to direct the apparatus to determine whether to update the set of definitions and the one or more processors responsive to a determination to update the set of definitions, update the sets of definitions using information from the generated reports.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
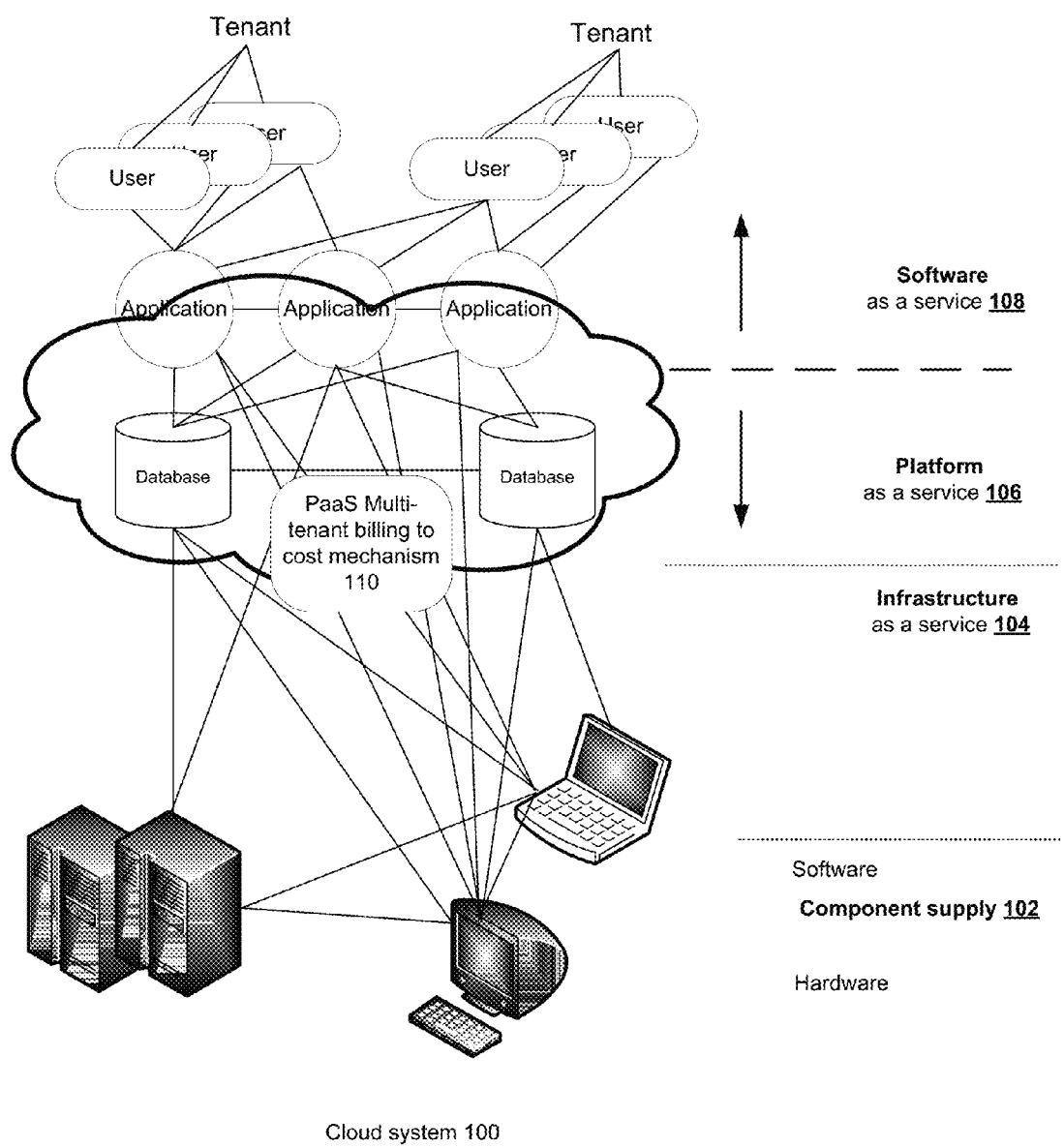
FIG. 1 is a block diagram of a cloud data processing system with a multi tenant billing to cost mechanism in accordance with one embodiment of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing. More specific examples (a non-exhaustive list) of the computer-readable data storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device. A computer readable storage device, as an example of a computer-readable data storage device, does not encompass propagation media.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
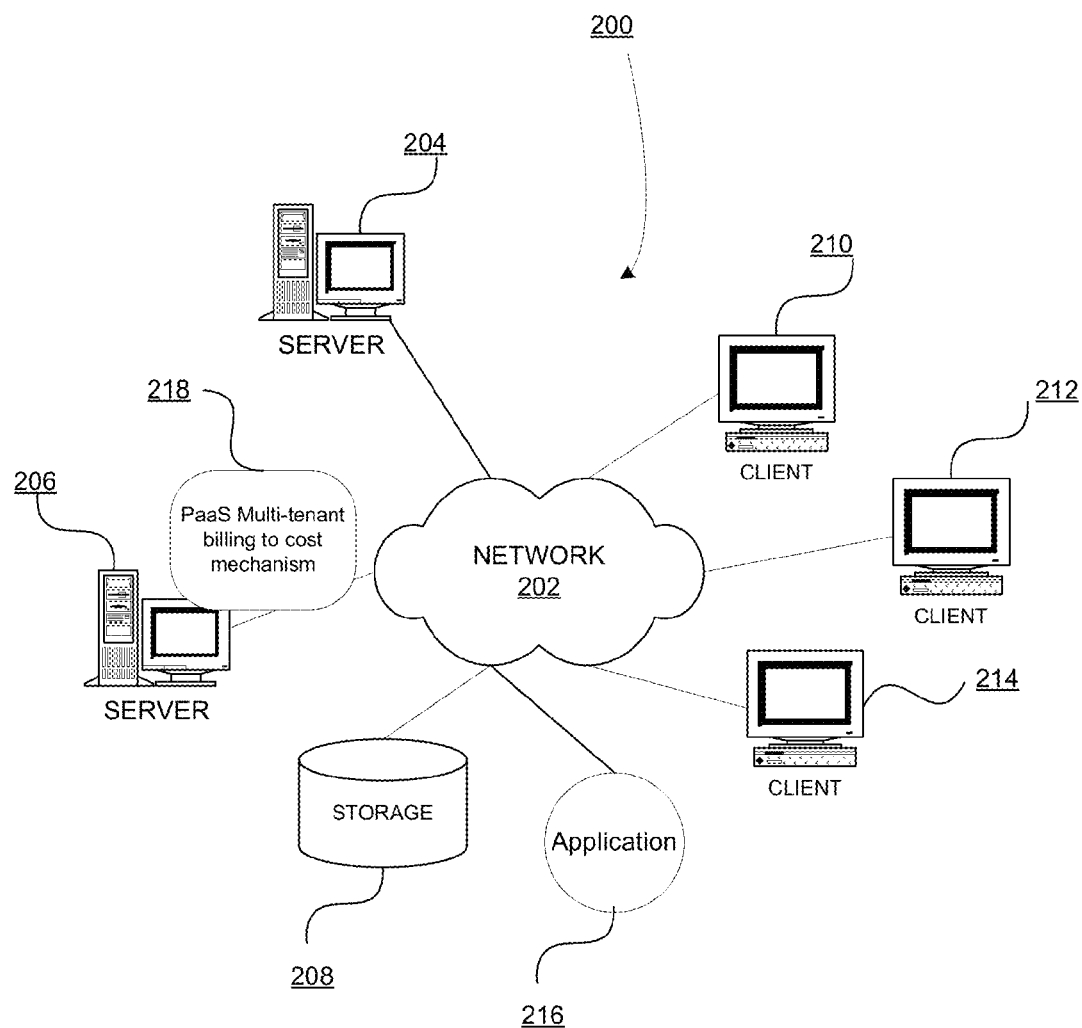
FIG. 2 is a block diagram of an exemplary network data processing system portion view of the cloud data processing system of FIG. 1 in accordance with one embodiment of the disclosure.
Figure 3:
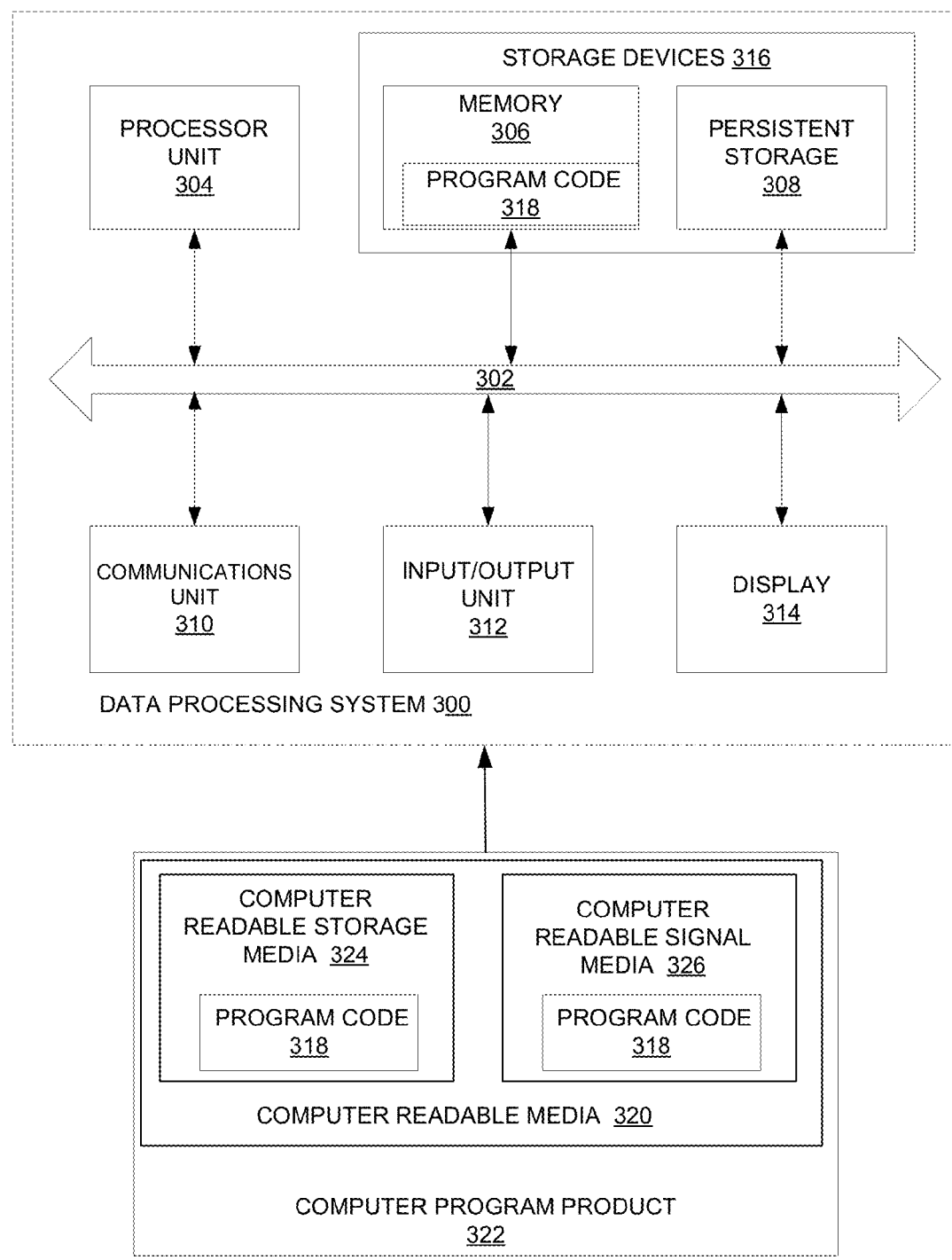
FIG. 3 is a block diagram of an exemplary data processing system of the cloud data processing system of FIG. 1 in accordance with one embodiment of the disclosure.

With reference now to FIG. 2 and FIG. 3, exemplary diagrams of data processing environments are provided in which illustrative embodiments may be implemented. It should be appreciated that FIG. 2 and FIG. 3 are only exemplary and are not intended to assert or imply any limitation with regard to the environments in which different embodiments may be implemented. Many modifications to the depicted environments may be made.

With reference to FIG. 2 a block diagram of an exemplary network data processing system portion view of the cloud data processing system of FIG. 1 operable for various embodiments of the disclosure is presented. FIG. 2 depicts a pictorial representation of a network of data processing systems in which illustrative embodiments of the cloud data processing system may be implemented. Network data processing system 200 is a network of computers in which the illustrative embodiments may be implemented. Network data processing system 200 contains network 202, which is the medium used to provide communications links between various devices and computers connected together within network data processing system 200. Network 202 may include connections, such as wire, wireless communication links, or fiber optic cables.

In the depicted example, server 204 and server 206 connect to network 202 along with storage unit 208 and application 216. In addition, clients 210, 212, and 214 connect to network 202. Clients 210, 212, and 214 may be, for example, personal computers or network computers. In the depicted example, server 204 provides data, such as boot files, operating system images, and applications to clients 210, 212, and 214. Clients 210, 212, and 214 are clients to server 204 and to server 206 in this example. Server 206 further provides PaaS multi-tenant billing to cost mechanism 218 (an implementation of PaaS multi-tenant billing to cost mechanism 110 of FIG. 1) to clients 210, 212, and 214. PaaS multi-tenant billing to cost mechanism 218 provides capabilities to service providers as well as clients of multiple tenants through local and remote capabilities of network 202. Network data processing system 200 may include additional servers, clients, and other devices not shown.

Platform-as-a-Service multi-tenant billing to cost mechanism 218 is implemented at a layer 2 level as shown in Platform-as-a-Service 106 of FIG. 1, in an embodiment of the disclosure, providing a capability of identifying a simple, universal, well-understood set of basic billing measures in relationship to any application software. In turn, the billing measures map to appropriate service provider cost elements for evaluation of a measure/price ratio. Platform-as-a-Service multi-tenant billing to cost mechanism 218 in an embodiment of the disclosure supports billing measures and cost elements in an evolving multi-tenant, multi-application matrix and growing infrastructure. Further, as the cost elements may be difficult, costly or impossible to accurately measure, Platform-as-a-Service multi-tenant billing to cost mechanism 218 provides a capability for regular review of net cost/measure balance.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for the different illustrative embodiments.

With reference to FIG. 3 a block diagram of an exemplary data processing system of the cloud data processing system of FIG. 1 operable for various embodiments of the disclosure is presented. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device, also referred to as a computer readable data storage device, is any piece of hardware that is capable of storing information, such as, for example without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications and/or programs may be located in storage devices 316, which are in communication with processor unit 304 through communications fabric 302. In these illustrative examples the instructions are in a functional form on persistent storage 308. These instructions may be loaded into memory 306 for execution by processor unit 304. The processes of the different embodiments may be performed by processor unit 304 using computer-implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable storage media of a computer readable data storage device, including memory 306 or persistent storage 308. For example, in one embodiment of the disclosure, program code 318 contains code comprising an implementation of Platform-as-a-Service multi-tenant billing to cost mechanism 218 of FIG. 2.

Program code 318 is located in a functional form on computer readable storage media 320 that is selectively removable and may be loaded onto or transferred to data processing system 300 for execution by processor unit 304. Program code 318 and computer readable storage media 320 form computer program product 322 in these examples. In one example, computer readable storage media 320 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable storage media 320 also may take the form of a persistent storage, such as a hard drive, a thumb drive, or a flash memory that is connected to data processing system 300. The tangible form of computer readable storage media 320 is also referred to as computer recordable storage media. In some instances, computer readable storage media 320 may not be removable. Computer readable storage media 320 does not contain computer readable signal media as is used for propagation or transmission of a computer readable signal.

Alternatively, program code 318 may be transferred to data processing system 300 from computer readable storage media 320 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 318 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

Using data processing system 300 of FIG. 3 as an example, a computer-implemented process for reconciling billing measures to cost factors is presented. Processor unit 304 receives, by one or more processors, a set of billing measures from one or more applications and receives a set of cost factors from infrastructure feeds. The one or more processors of processor unit 304 analyzes the set of billing measures and cost factors received, using a set of defined relationships to create analyzed information. The one or more processors of processor unit 304 generate a set of reports using the analyzed information. Responsive to a determination to update the set of definitions, the one or more processors of processor unit 304 update the sets of definitions using information from the generated reports. Processor unit 304 also sends a set of reports to a client (tenant) as well as a set of reports to a service provider.

Figure 4:
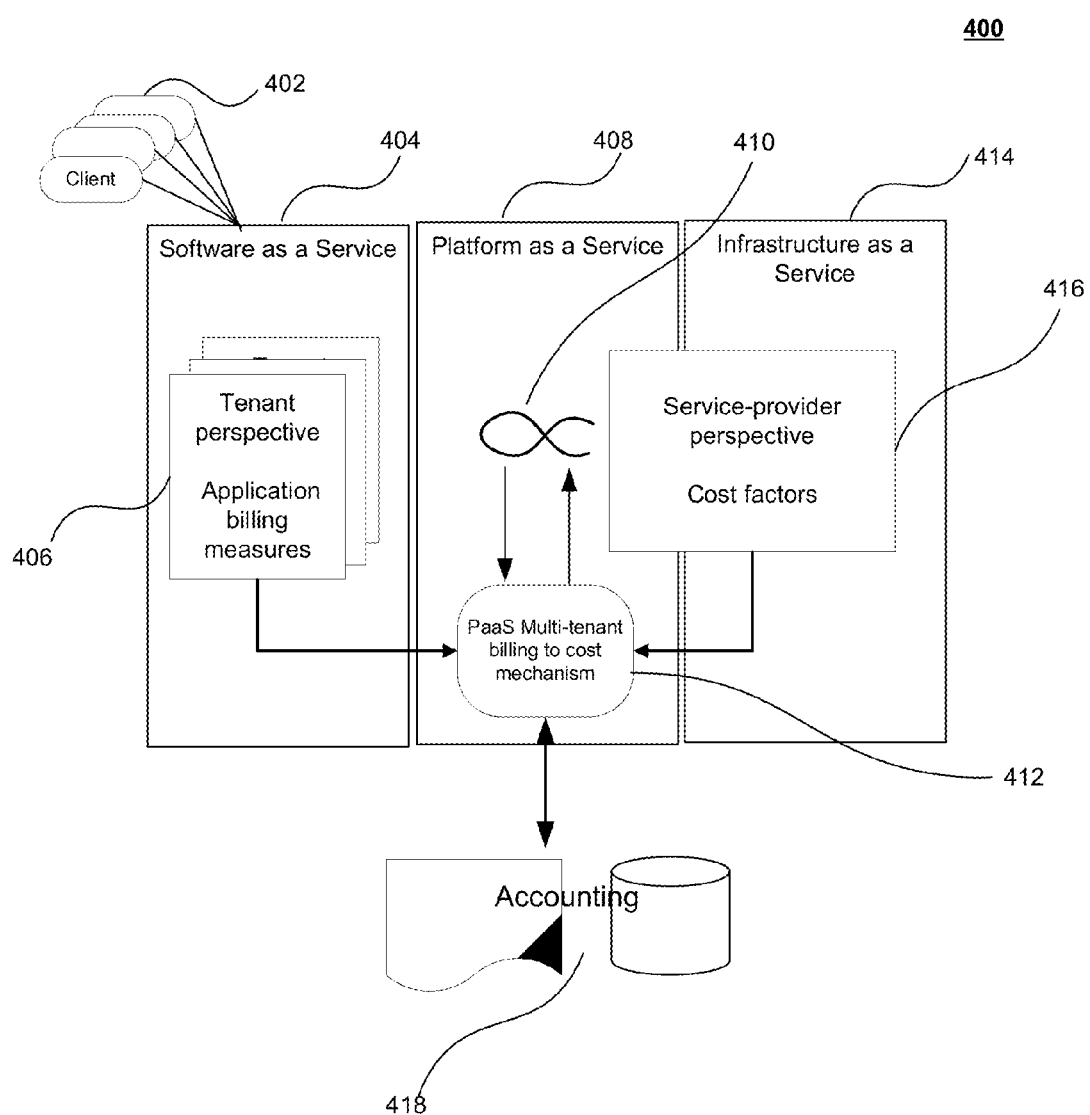
FIG. 4 is a block diagram representation of components of a multi-tenant billing to cost process operable for various embodiments of the disclosure.

With reference to FIG. 4 a block diagram of components of a multi-tenant billing to cost process operable for various embodiments of the disclosure is presented. Process 400 is an example, in a logical view, of a process of Platform-as-a-Service multi-tenant billing to cost mechanism 110 of FIG. 1.

Cost accounting is not new to economics. Relating revenue to expenses is a well-known exercise typically performed at higher levels of accounting roll-up. In view of evolving computing paradigms, and a gap in client-product understanding of underlying complexity and frequently changing nature of technology, a structured cloud-based tenant perspective to provider perspective model is proposed at an operational or platform level as illustrated.

In one embodiment, presenting a simple application-based view to the client (referred to as a tenant perspective) while accurately measuring cost factors (for a service provider perspective), the embodiment defines a process used to identify and define client (tenant) application billing measures 406 (across one or more (multiple) tenants 402, and/or one or more (multiple) applications). The process of the embodiment further identifies and/or defines technical, measurable cost factors 416 for the previously defined layers including Platform as a Service 408, and Infrastructure as a Service 414. Infrastructure as a Service 414 further comprises the component supply 102 of FIG. 1 including supporting hardware and software elements.

In one example, definitions of identified client (tenant) billing measures and definitions of identified technical, measurable cost factors and the identified relationships among client billing measures and cost factors may be contained in a set of documents using an extensible markup language (XML). The set of files enables a detailed specification of components with associated attributes and a correspondence between the client billing measures and cost factors as identified relationships.

Relationships 410 among client billing measures 406 and cost factors 416 are identified. A set of operations comprising Platform as a Service multi-tenant billing to cost mechanism 412 of the illustrative embodiment implemented as a platform service, that is application and infrastructure independent, provides a capability to define and receive multi-tenant billing measures 406 from Software as a Service 404 (application) feeds.

An embodiment of the disclosed Platform-as-a-Service multi-tenant billing to cost mechanism 412 further provides a capability to define and receive cost factor measures 416 from infrastructure feeds and provide functional analysis and tuning of defined relationships by applying statistical methodologies such as, but not restricted to, least-squares (linear, non-linear), least-squares $n^{th}$ degree polynomials, multiple regression least-squares. Usage growth (linear) versus infrastructure investment (stepped) analysis is also included in the capabilities of the mechanism disclosed.

Platform-as-a-Service multi-tenant billing to cost mechanism 412 in an illustrative embodiment provides, or interfaces with, accounts-receivable application(s) 418 for generation of client statements and billing. An embodiment of the disclosure typically simplifies billing because of the decoupled cost analysis. Platform as a Service 408 implementation enables a single mechanism supporting multiple applications, which may vary in their billing models and grow over time. Platform as a Service 408 implementation further typically enables multi-tenant implementation for efficiency of scale, while providing a single integration point for accounting and enabling frequent, ongoing cost analysis and tuning of billing rules. Support is thus provided for multiple billing models while also enabling reconciliation of billing to costs and subsequent tuning of relationships previously defined.

Figure 5:
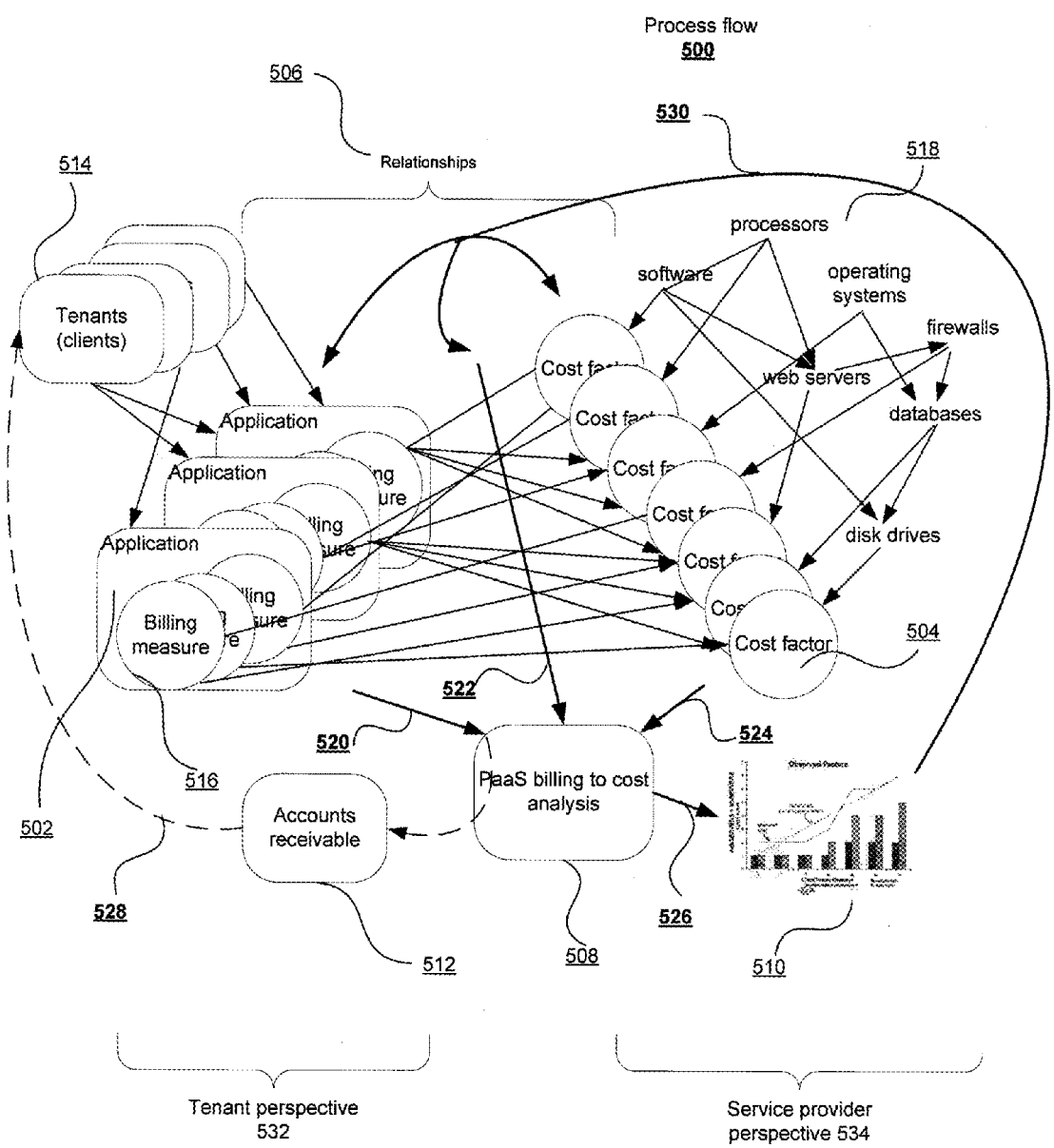
FIG. 5 is a block diagram of a process flow using the multi-tenant billing to cost process of FIG. 4 in accordance with one embodiment of the disclosure.

With reference to FIG. 5 a block diagram of a process flow of the multi-tenant billing to cost process of FIG. 4 in accordance with one embodiment of the disclosure is presented. Process flow 500 is an example of the flow of an example using Platform-as-a-Service multi-tenant billing to cost mechanism 412 of FIG. 4.

Process flow 500, an overall information flow of the example, in one embodiment addresses revenue and cost reconciliation in a growing complex cloud paradigm, which introduces a variety of tenants 514, applications 502 and shared infrastructure. Information moves through the process using a set of flows comprising flow 520, flow 522, flow 524, flow 526, flow 528 and flow 530. The set of flows provide an iterative cycle in which information may be developed, consumed and reused to refine assumptions and results.

Process flow 500 contains inputs representing one or more applications comprising one or more respective billing measures 516 (from the client/tenant perspective 532). Information representative of billing measures 516 arrives at Platform-as-a-Service multi-tenant billing to cost analysis 508 through flow 520. Information representative of cost factors 504 (from the service provider perspective 534) also flows into Platform-as-a-Service multi-tenant billing to cost analysis 508 however using flow 524. Cost factors 504 are representative of and derived from infrastructure components 518 including hardware components and software components.

Platform-as-a-Service multi-tenant billing to cost analysis 508 process the information representative of billing measures 516 and cost factors 504 in the context of relationships 506 (defining the influence of billing measures 516 to cost factors 504) provided through flow 522. Analysis in the form of Platform as a service billing to cost analysis 508 provides statistical analysis for continued observation and review of inputs including billing measures 516 and cost factors 504 and tuning of relationships 506 using flow 526 and flow 530. A result of the analysis may be in the form of report 510 output through flow 526. Further process flow 500 provides accounts receivable 512 integration for client statements and billing delivered using flow 528.

Relationships 506 define a correspondence between various application based billing measures and respective infrastructure cost factors. The defined correspondence, from the tenant perspective 532 may be a one to one relationship, many to one relationship or a one to many relationship as needed by a particular configuration in an embodiment of the process.

Figure 6:
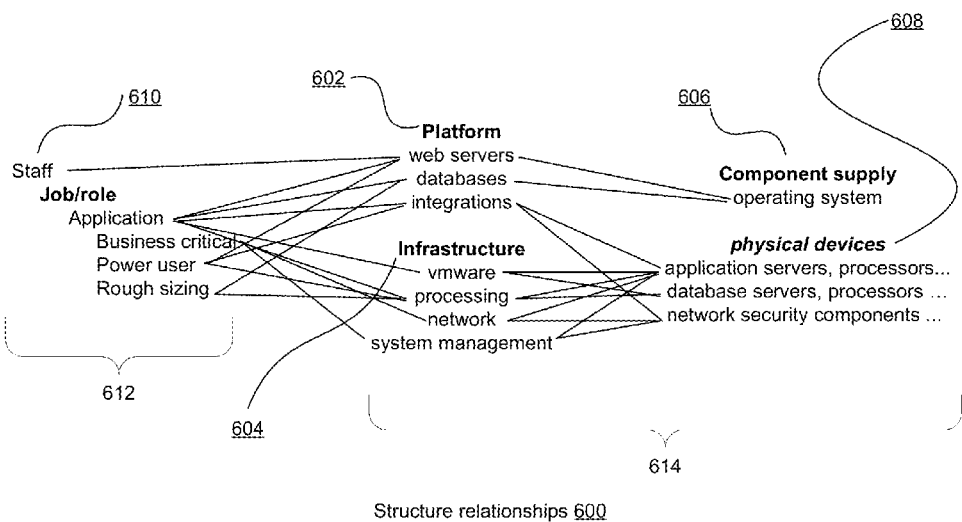
FIG. 6 is a textual representation of a subset of client/tenant measures to cost factors of the multi-tenant billing to cost process of FIG. 4 in accordance with one embodiment of the disclosure.

With reference to FIG. 6 a textual representation of a subset of client/tenant measures to cost factors of the multi-tenant billing to cost process of FIG. 4 in accordance with one embodiment of the disclosure is presented. Structure relationships 600 is an example of a portion of relationship definitions used in an embodiment of Platform-as-a-Service multi-tenant billing to cost mechanism 412 of FIG. 4.

Inputs in the form of billing measures are defined that may be applied across applications as well as across tenants. Billing measures are defined as simply as possible from a client-view. The client/tenant perspective may be stated as an employee has the responsibility to perform task X and uses application Y to accomplish a job on a daily basis. Hierarchically, considerations of the example can be represented in billing measure 610 as Staff⇒ Job/Role⇒ Application, wherein application is further characterized by attributes of components of tenant perspective 612, for example, business critical having a yes/no value; usage having a definable measure such as seldom, moderate, frequent, full time or power user and rough sizing based on a few key application elements, for example, assets= 100 s ↔ 10,000 s ↔ 100,000 s ↔ 1,000,000 s. The applications may be monitored, queried or transfer this data to Platform-as-a-Service multi-tenant billing to cost mechanism 412 of FIG. 4.

Cost factors are defined from the service provider view 614 identifying measurable elements. The service provider perspective is reflective of, for example, a statement of for the clients, is purchased and managed an infrastructure including software, systems, networks, and additional respective components. Hierarchically the definitions may be structured as platform 602→applications; webservers; databases; integrations; and support resources (staff or fees), with Infrastructure 604→virtual machine ware (vmware); processing; network; and system management (including support resources including staff or fees), further related to elements of Component Supply 606→operating system including physical devices 608, for example, application servers, processors; database servers, processors; network security components.

Cost factors may grow in detail as determined by the service provider cost accounting and be monitored, queried or transferred to the Platform as a Service billing to cost mechanism. There may be other considerations for client, application or service provider, but the example is intended for illustration purposes, not limiting the invention. As will be seen, the mechanism of the disclosure proposes a generalized process supporting a multitude of specific implementation considerations.

As shown in the examples, using the relationship definitions enables the billing measures to be decoupled from the respective cost factors. Establishing the relationships that identify billing measure influence on cost factors to be entered into the Platform as a Service billing to cost mechanism defines a set of relationships that are multitudinous and transitive in nature. During a definition portion the client/tenant measures are identified as something that is understood and measurable in the form of cost elements that are measurable as a real value cost.

Additionally, each application (Software as a Service offering) may have respective unique measures and relationships. Relationships are defined based on initial estimation and observation; however the definitions provided are adjustable using results of the described analysis over time. The relationships illustrated can be expanded and, for each application, represented as a series of mathematically expressed relationships. For example, the expression of relationships may include a number of webservers=pWS $c_1U+c_2B+c_3P$; a number of databases=pDB $c_4(pWS)+c_5S_1+c_6S_2+c_7S_3+c_8S_4$; a number of app servers=cAS $c_{x1}(PWS)+$ $c_{x2}(iVM)+c_{x3}(iPR)+c_{x4}(iNW)+c_{x5}(iSM)$; where U represents a number of users; and as per application definitions, B represents business critical users/applications; P represents a number of power users; $S_1$ represents a number of small sized tenants; $S_2$ represents a number of medium sized tenants; $S_3$ represents a number of large sized tenants; $S_4$ represents a number of very large sized tenants; and $c_1$ through $c_{x5}$ represents constants to be determined and reviewed using trend analysis.

Figure 7:
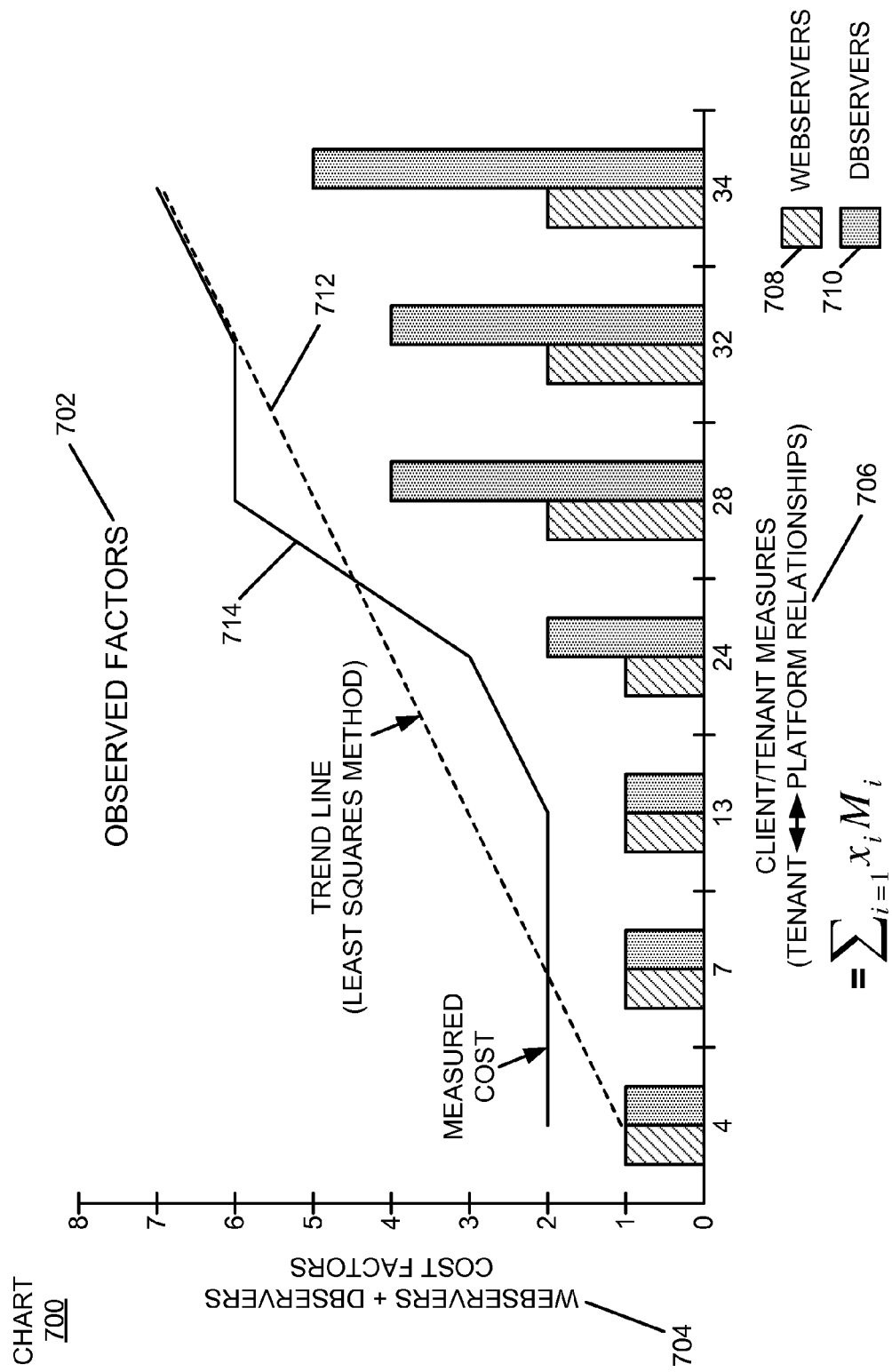
FIG. 7 is a chart representation of a subset of client/tenant measure to cost factors observations of the multi-tenant billing to cost process of FIG. 4 in accordance with one embodiment of the disclosure.

With reference to FIG. 7 is a chart representation of a subset of client/tenant measure to cost factors of the multi-tenant billing to cost relationships of FIG. 6 in accordance with one embodiment of the disclosure is presented. Chart 700 is an example of analysis output using the process of multi-tenant billing to cost relationships of FIG. 6.

Examining the relationship expressions provided in the example of FIG. 6 and plotting the client/tenant measures with a subset of the cost factor observations, as observed factors 702 (for example the number of webservers 708 and the number of database servers 710) yields the graph of chart 700.

A set of observed factors or estimates is first used to establish an initial baseline or trend as represented by trend line 712. In the simple example subset illustrated, the measured cost line 714 is directly related the observed number of servers required with a defined measure of usage (for example a new webserver is required at 80% utilization). This actual cost, therefore, periodically increases in set values, that is the cost of each added server as the usage of a server reached a defined maximum utilization.

However, as more cost factors are added, this line becomes smoother and in actuality approaches trend line 712, with the more cost measures yielding a more accurate trend line. Note, however, an original goal to simplify client/tenant measures 706 is balanced with the webSERVERS and dbSERVERS cost factors 704 of the service provider cost measures, which may grow exceedingly complex.

Ultimately, the relationships are defined as variables and constants in a construct of (client and tenant measures)= (tenant↔Platform as a Service relationships)+ (tenant↔Infrastructure as a Service relationships)+(Platform as a Service+Infrastructure as a Service↔Component Supply) which is expressed as:

$$\Sigma_{i=1}x_iM_i=\Sigma_{m=1}x_mP_m+\Sigma_{n=1}x_nI_n+\Sigma_{o=1}x_oC_o$$

where M represents tenant measures, P represents Platform as a Service measures, I represents Infrastructure as a Service measures, C represents Component Supply measures, x represents constants to be determined for a best fit and i, m, n, and o represent a number of measures/relationships for the particular input.

Analysis of the defined relationships performed over time by applying statistical methodologies such as, but not restricted to, least-squares (linear, non-linear), least-squares $m^{th}$ degree polynomials, multiple regression least-squares enables tuning of the defined relationships, as well as additional applications, billing measures or cost factors.

Recognizing that cost accounting may also include other considerations and resources outside of the operations infrastructure (sales and marketing, related product offerings, lost-leader strategies), the disclosed mechanism provides a model for analysis based on increasingly accurate data for consideration within a larger business strategies.

Accounts receivable integration is typically simplified over the Platform as a Service infrastructure because all applications and tenants feed into a single point with respective specific billing measures. By applying a common service, each application typically implements a pre-defined integration process (monitored, queried, data transaction or transfer) and accordingly simplifies a growing complexity of a product of tenants multiplied over a number of applications.

As a result, an embodiment of the disclosed mechanism simplifies billing defined for the client as required by the application; the disclosed mechanism supports a number of billing models (for example, subscription based, usage based) or a combination thereof. Decoupling cost factors enables cost analysis to grow in technical complexity as required by a service provider, supporting both capital expenditures and service fees.

Embodiments of the Platform as a Service billing measures to cost factors mechanism provides a capability of a single billing and analysis mechanism to support multiple tenants and multiple applications, a growing challenge within the cloud computing paradigm. Embodiments of the disclosure further typically enable an efficiency of scale gained by multi-tenancy while minimizing added complexity of billing and accounting. Similarly embodiments of the disclosed mechanism provides a capability for a single integration point for accounts receivable while also enabling frequent, ongoing cost analysis and associated tuning of billing rules in an ever growing matrix of tenants, applications and infrastructure.

Figure 8:
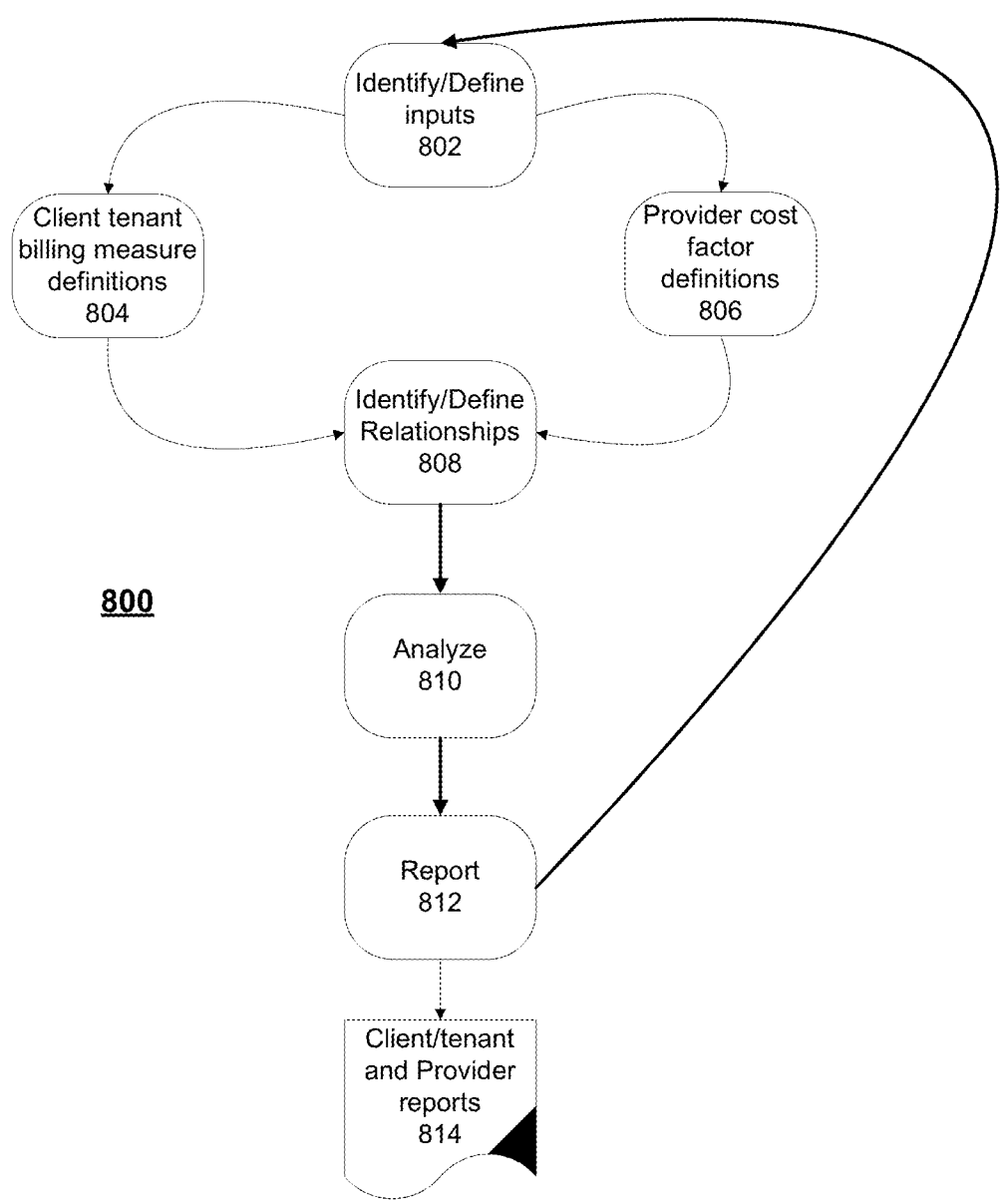
FIG. 8 is a high level flowchart of the multi-tenant billing to cost process of FIG. 4 in accordance with one embodiment of the disclosure.

With reference to FIG. 8 is a high level flowchart of the multi-tenant billing to cost process of FIG. 4 in accordance with one embodiment of the disclosure. Process 800 is a high level representation of the previously described multi-tenant billing to cost process.

Process 800 begins and identifies a set of inputs (step 802). The set of inputs is representative of the client and tenant perspective in the form of client/tenant billing measures associated with one or more applications used or available for use by the various tenants and associated clients. The client and tenant perspective accordingly represents multi-tenant, multi-application inputs. The set of inputs is also representative of the service provider perspective in the form of various platforms as a service and infrastructure as a service components and associated elements.

Output of the identification sub-process is a set of client/tenant billing measure definitions 804 and provider cost factor definitions 806. In one example, the set of definitions may be provided using one or more documents in the form of XML source files describing the individual client/tenant billing measures including respective attributes and values and provider cost factors including respective attributes and values.

Process 800 identifies and defines relationships between client/tenant billing measure definitions 804 and provider cost factor definitions 806 (step 808). A correspondence between client/tenant billing measure definitions 804 and provider cost factor definitions 806 may be provided, in one example, using a set of predefined rules identifying conditional matching of particular billing measures with a respective one or more cost factors. For example, a rule may define a relationship for a web-based application transaction as related to a particular database, a web server and a network resource. In turn the related resources may further detail relationships to underlying hardware and software resources including operating system, processors and storage devices. Thus the relationships defined range from simple one to one to a more complex one to many or many to one forms and are structured in a hierarchy of levels. Again using the example of a document object model, a data structure is populated using the definitions representative of the inputs and relationships identified and defined among the inputs.

Process 800 analyzes the combination of inputs using the definitions representative of the inputs and relationships identified and defined among the inputs (step 810). Various forms of statistical analysis may be used without limitation including least-squares (linear, or non-linear), least-squares $m^{th}$ degree polynomials, and multiple regression least-squares methods.

As a resulting of performing statistical analysis of the inputs using the relationships, process 800 generates one or more reports (step 812). The gyration of resorts includes providing or interfacing with one or more accounts-receivable applications for creating client statements and billing reports. Reports may also be created for service providers, for example, indicating at least utilization of defined resources according to tenants. Process 800 sends client and service provider the generated reports (step 814).

Further the output of the analysis may be used to iteratively adjust the definitions (including rules to identify inputs and relationships) used in the process in a form of feedback loop from step 812 to step 802. Using this feedback mechanism enables process 800 to continually and incrementally improve the particulars of information used in the process.

Figure 9:
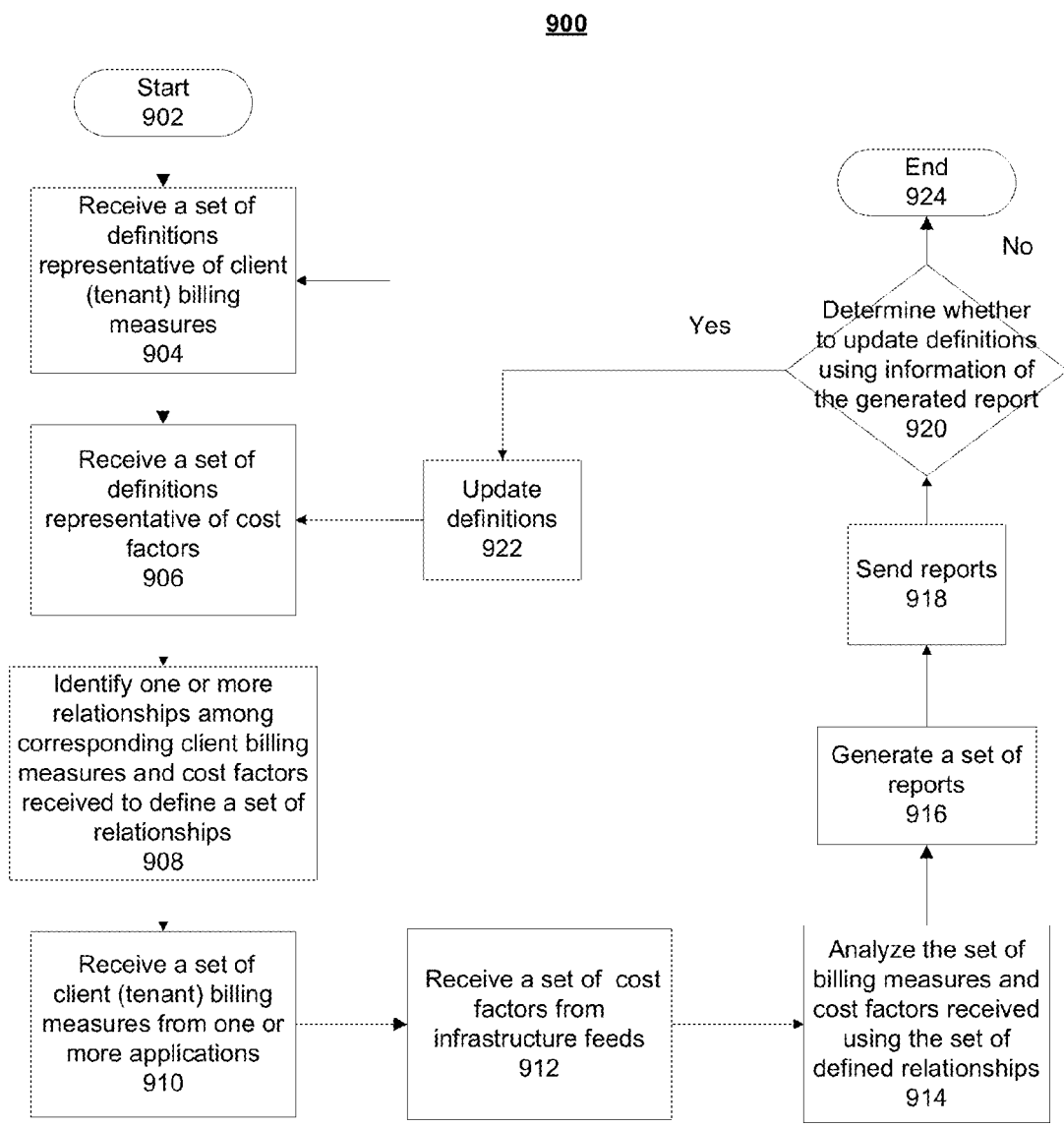
FIG. 9 is a flowchart of the multi-tenant billing to cost process of FIG. 8 in accordance with one embodiment of the disclosure.

With reference to FIG. 9 is a flowchart of the multi-tenant billing to cost process of FIG. 4 in accordance with one embodiment of the disclosure. Process 900 is a representation of the previously described multi-tenant billing to cost process.

Process 900 begins (step 902) and receives a set of definitions representative of client and tenant billing measures (step 904). The client/tenant billing measures are associated with one or more applications used, or available for use, by the various tenants and associated clients. Thus the client (tenant) billing measures are representative of a multi-tenant, multi-application environment of the clients and tenants.

Process 900 also receives a set of definitions representative of cost factors representative of the service provider perspective in the form of various platform as a services and infrastructure as a service components and respective associated elements (step 906). A combination of the set of definitions representative of client and tenant billing measures and the set of definitions representative of cost factors presents a simple application-based view to the client as a tenant perspective while accurately measuring cost factors for the service provider. In another example of data capture, the sets of definitions may exploit previously captured information from modeling tools or system management and network management tools.

Output of the identification sub-process of step 904 and step 906 is a set of client/tenant billing measure definitions and provider cost factor definitions. As previously described in one example, the sets of definitions may be provided using one or more documents as a set of XML source files describing the individual client/tenant billing measures including respective attributes and values and service provider cost factors including respective attributes and values. The document object model is well suited to the hierarchical structure of each set of definitions.

Process 900 identifies one or more relationships among client/tenant billing measure definitions and provider cost factor definitions to define a set of relationships (step 908). A correspondence between the client/tenant billing measure definitions and provider cost factor definitions as previously identified and defined may be provided, in one example, by using a set of predefined rules identifying conditional matching of particular billing measures with a respective one or more cost factors. For example, a rule may define a relationship for a web-based application transaction as related to a particular database, a web server and a network resource.

In turn the related resources may further detail relationships to underlying hardware and software resources including operating system, processors and storage devices. Thus the relationships defined range from simple one to one to a more complex one to many or many to one forms and are structured in a hierarchy of levels. Again using the example of a document object model, a data structure is populated using the definitions representative of the inputs and relationships identified and defined among the inputs.

Process 900 receives a set of client/tenant billing measures from one or more applications (step 910). Typically the applications are associated with software as a service applications but need not be necessarily restricted to such applications. In a similar manner process 900 receives a set of cost factors from one or more infrastructure feeds (step 912). The infrastructure feeds provide information associated with the particular defined technical, and measurable cost factors representative of components of the platform as a service and infrastructure as a service of a current environment.

Process 900 analyzes the combination of inputs of the set of client/tenant billing measures and cost factors using the definitions representative of the inputs and relationships identified and defined among the inputs (step 914). Various forms of statistical analysis may be used in performing the analysis without limitation including least-squares (linear, or non-linear), least-squares $m^{th}$ degree polynomials, and multiple regression least-squares methods. Embodiments of the disclosed process accordingly enable usage growth (linear) versus infrastructure investment (stepped) analysis.

As a result of performing the analysis of the inputs using the relationships and one or more selected predetermined statistical methodologies, process 800 generates one or more reports (step 916). The generation of reports includes providing or interfacing with one or more accounts-receivable applications for creating client statements and billing reports. Reports may also be created for service providers, for example, indicating at least utilization of defined resources according to respective tenants. Process 900 sends client and service provider one or more respective generated reports (step 918).

Process 900 determines whether to update definitions using information of the generated reports (step 920). Responsive to a determination to update definitions using information of the generated reports the output of the analysis may be used to iteratively adjust the definitions (including rules to identify inputs and relationships) used in the process in a form of feedback loop from step 922 to step 904 and step 906 respectively. Using this feedback mechanism enables process 900 to, continually and incrementally, improve the particular information comprising the sets of definitions used in the process. Responsive to a determination to not update definitions using information of the generated reports, process 900 terminates (step 924).

Thus embodiments of the disclosed process provide a mechanism with a capability of simplified billing with decoupled cost analysis. In one example, using a platform as a service implementation enables the single mechanism supporting multiple applications, which may vary in use of billing models, and grow over time. The multi-tenant implementation also provides an efficiency of scale while providing a single integration point for accounting. The output generated enables frequent, ongoing cost analysis and tuning of billing rules in a continual incremental manner.

Thus is presented in an illustrative embodiment a process for reconciling billing measures to cost factors, comprises receiving, by one or more processors, a set of billing measures from one or more applications and a set of cost factors from infrastructure feeds. Analyzing the set of billing measures and cost factors received, using a set of defined relationships to create analyzed information. The one or more processors generate a set of reports using the analyzed information. Responsive to a determination to update the set of definitions, the one or more processors update the sets of definitions using information from the generated reports.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product for reconciling billing measures to cost factors, the computer program product comprising:

one or more computer-readable data storage devices and computer executable program code stored on at least one of the one or more computer-readable data storage devices, where the computer executable program code when executed on one or more processors causes the one or more processors to provide an adjustable tenant billing to cost mechanism as a platform service from a platform-as-a-service (PaaS) layer within a distributed multi-tenant computing environment that comprises multiple distinct host computing platforms, comprising causing the one or more processors to:

receive, at the PaaS layer over at least one application feed from at least one software-as-a-service (SaaS) application operating in a SaaS layer within the distributed multi-tenant computing environment, a set of client-application billing measures of multi-tenant computing services;

receive, at the PaaS layer over at least one infrastructure feed from at least one multi-tenant platform host operating in an infrastructure-as-a-service (IaaS) layer within the distributed multi-tenant computing environment, a set of service-provider cost factors of a plurality of different types of platform and infrastructure components used to provide services within the multi-tenant computing environment;

analyze the set of client-application billing measures and the set of service- provider cost factors using a set of defined relationships within the PaaS layer that identify influence of the set of client-application billing measures in the SaaS layer on the set of service-provider cost factors in the IaaS layer; and adjust, in accordance with the analysis as an improvement of the platform service provided from the PaaS layer and using a feedback mechanism within the multi-tenant computing environment, the set of defined relationships within the PaaS layer that identify the influence of the set of client-application billing measures in the SaaS layer on the set of service-provider cost factors in the IaaS layer.

2. The computer program product of claim 1, where, in causing the one or more processors to receive, at the PaaS layer over the at least one application feed from the at least one SaaS application operating in the SaaS layer within the distributed multi-tenant computing environment, the set of client-application billing measures of the multi-tenant computing services, the computer executable program code causes the one or more processors to:

receive a set of definitions representative of the set of client-application billing measures associated with one or more clients or tenants and associated with the at least one SaaS application.

3. The computer program product of claim 1, where, in causing the one or more processors to receive, at the PaaS layer over the at least one infrastructure feed from the at least one multi-tenant platform host operating in the IaaS layer within the distributed multi-tenant computing environment, the set of service-provider cost factors of the plurality of different types of platform and infrastructure components used to provide services within the multi-tenant computing environment, the computer executable program code causes the one or more processors to:

receive a set of definitions representative of the set of service-provider cost factors, where the at least one infrastructure feed is derived from PaaS components and IaaS components within the multi-tenant computing environment, and the IaaS components further comprise component supply elements comprising hardware and software elements within the multi-tenant computing environment.

4. The computer program product of claim 1, further comprising computer executable program code that when executed on the one or more processors causes the one or more processors to:

identify the set of defined relationships within the PaaS layer that identify the influence of the set of client-application billing measures in the SaaS layer on the set of service-provider cost factors in the IaaS layer; and establish the set of defined relationships within the PaaS layer of the distributed multi-tenant computing environment.

5. The computer program product of claim 1, where, in causing the one or more processors to analyze the set of client-application billing measures and the set of service-provider cost factors using the set of defined relationships within the PaaS layer that identify the influence of the set of client-application billing measures in the SaaS layer on the set of service-provider cost factors in the IaaS layer, the computer executable program code causes the one or more processors to:

perform one or more statistical analysis including least-squares (linear, or non-linear), least-squares $m^{th}$ degree polynomials, and multiple regression least-squares methods where cost analysis is decoupled from billing.

6. The computer program product of claim 1, where the computer executable program code when executed on the one or more processors further causes the one or more processors to generate, as part of the platform service, a set of reports using the analysis, comprising the computer executable program code causing the one or more processors to:

at least one of provide and interface with one or more accounts-receivable applications within the multi-tenant computing environment to create client statements and billing reports in the set of reports;

create reports for service providers within the multi-tenant computing environment, indicating in the set of reports at least utilization of defined resources according to respective tenants; and send to a respective client and a respective service provider one or more respective generated reports from the set of reports.

7. The computer program product of claim 1, where, in causing the one or more processors to adjust, in accordance with the analysis as the improvement of the platform service provided from the PaaS layer and using the feedback mechanism within the multi-tenant computing environment, the set of defined relationships within the PaaS layer that identify the influence of the set of client-application billing measures in the SaaS layer on the set of service-provider cost factors in the IaaS layer, the computer executable program code causes the one or more processors to:

iteratively adjust, via the feedback mechanism within the multi-tenant computing environment, at least one set of definitions selected from a group consisting of a set of client- application billing measure definitions representative of the set of client-application billing measures, a set of service-provider cost factor definitions representative of the set of service- provider cost factors, and a set of relationship definitions representative of the set of defined relationships that identify the influence of the set of client-application billing measures in the SaaS layer on the set of service-provider cost factors in the IaaS layer;

where the set of client-application billing measure definitions and the set of service- provider cost factor definitions identify inputs and the defined relationships between the set of client-application billing measures in the SaaS layer and the set of service-provider cost factors in the IaaS layer; and where the iterative adjustment occurs continually and incrementally in a feedback loop to each of the PaaS layer, the SaaS layer, and the IaaS layer via the feedback mechanism within the multi-tenant computing environment in accordance with particular information comprising the set of client-application billing measure definitions for multiple SaaS applications, one or more respective SaaS billing models, and one or more respective tenants.

8. An apparatus for reconciling billing measures to cost factors, the apparatus comprising:

a communications fabric;

one or more computer-readable data storage devices connected to the communications fabric;

a memory connected to the communications fabric, where the memory contains computer executable program code;

a communications unit connected to the communications fabric;

an input/output unit connected to the communications fabric; and one or more processors connected to the communications fabric programmed to provide an adjustable tenant billing to cost mechanism as a platform service from a platform-as-a-service (PaaS) layer within a distributed multi-tenant computing environment that comprises multiple distinct host computing platforms, comprising the one or more processors being programmed to:

receive, at the PaaS layer over at least one application feed from at least one software-as-a-service (SaaS) application operating in a SaaS layer within the distributed multi-tenant computing environment, a set of client-application billing measures of multi-tenant computing services;

receive, at the PaaS layer over at least one infrastructure feed from at least one multi-tenant platform host operating in an infrastructure-as-a-service (IaaS) layer within the distributed multi-tenant computing environment, a set of service-provider cost factors of a plurality of different types of platform and infrastructure components used to provide services within the multi-tenant computing environment;

analyze the set of client-application billing measures and the set of service-provider cost factors using a set of defined relationships within the PaaS layer that identify influence of the set of client-application billing measures in the SaaS layer on the set of service-provider cost factors in the IaaS layer; and adjust, in accordance with the analysis as an improvement of the platform service provided from the PaaS layer and using a feedback mechanism within the multi-tenant computing environment, the set of defined relationships within the PaaS layer that identify the influence of the set of client-application billing measures in the SaaS layer on the set of service-provider cost factors in the IaaS layer.

9. The apparatus of claim 8, where, in being programmed to receive, at the PaaS layer over the at least one application feed from the at least one SaaS application operating in the SaaS layer within the distributed multi-tenant computing environment, the set of client-application billing measures of the multi-tenant computing services, the one or more processors are programmed to:

receive a set of definitions representative of the set of client-application billing measures associated with one or more clients or tenants and associated with the at least one SaaS application.

10. The apparatus of claim 8, where, in being programmed to receive, at the PaaS layer over the at least one infrastructure feed from the at least one multi-tenant platform host operating in the IaaS layer within the distributed multi-tenant computing environment, the set of service-provider cost factors of the plurality of different types of platform and infrastructure components used to provide services within the multi-tenant computing environment, the one or more processors are programmed to:

receive a set of definitions representative of the set of service-provider cost factors, where the at least one infrastructure feed is derived from PaaS components and IaaS components within the multi-tenant computing environment, and the IaaS components further comprise component supply elements comprising hardware and software elements within the multi-tenant computing environment.

11. The apparatus of claim 8, where the one or more processors are further programmed to:

identify the set of defined relationships within the PaaS layer that identify the influence of the set of client-application billing measures in the SaaS layer on the set of service-provider cost factors in the IaaS layer; and establish the set of defined relationships within the PaaS layer of the distributed multi- tenant computing environment.

12. The apparatus of claim 8, where, in being programmed to analyze the set of client-application billing measures and the set of service-provider cost factors using the set of defined relationships within the PaaS layer that identify the influence of the set of client-application billing measures in the SaaS layer on the set of service-provider cost factors in the IaaS layer, the one or more processors are programmed to:

perform one or more statistical analysis including least-squares (linear, or non-linear), least-squares $m^{th}$ degree polynomials, and multiple regression least-squares methods where cost analysis is decoupled from billing.

13. The apparatus of claim 8, where the one or more processors are further programmed to generate, as part of the platform service, a set of reports using the analysis, comprising the one or more processors being programmed to:

at least one of provide and interface with one or more accounts-receivable applications within the multi-tenant computing environment to create client statements and billing reports in the set of reports;

create reports for service providers within the multi-tenant computing environment, indicating in the set of reports at least utilization of defined resources according to respective tenants; and send to a respective client and a respective service provider one or more respective generated reports from the set of reports.

14. The apparatus of claim 8, where, in being programmed to adjust, in accordance with the analysis as the improvement of the platform service provided from the PaaS layer and using the feedback mechanism within the multi-tenant computing environment, the set of defined relationships within the PaaS layer that identify the influence of the set of client-application billing measures in the SaaS layer on the set of service-provider cost factors in the IaaS layer, the one or more processors are programmed to:

iteratively adjust, via the feedback mechanism within the multi-tenant computing environment, at least one set of definitions selected from a group consisting of a set of client-application billing measure definitions representative of the set of client-application billing measures, a set of service-provider cost factor definitions representative of the set of service-provider cost factors, and a set of relationship definitions representative of the set of defined relationships that identify the influence of the set of client-application billing measures in the SaaS layer on the set of service-provider cost factors in the IaaS layer;

where the set of client-application billing measure definitions and the set of service-provider cost factor definitions identify inputs and the defined relationships between the set of client-application billing measures in the SaaS layer and the set of service-provider cost factors in the IaaS layer; and where the iterative adjustment occurs continually and incrementally in a feedback loop to each of the PaaS layer, the SaaS layer, and the IaaS layer via the feedback mechanism within the multi-tenant computing environment in accordance with particular information comprising the set of client-application billing measure definitions for multiple SaaS applications, one or more respective SaaS billing models, and one or more respective tenants.

* * * * *